United States Patent
Hallergren

(10) Patent No.: US 6,779,821 B2
(45) Date of Patent: Aug. 24, 2004

(54) BUMPER ARRANGEMENT

(75) Inventor: Ola Hallergren, Gammelstad (SE)

(73) Assignee: SSAB Hardtech AB, Lulea (SE)

( * ) Notice: Subject to any disclaimer, the term of this patent is extended or adjusted under 35 U.S.C. 154(b) by 0 days.

(21) Appl. No.: 10/381,172

(22) PCT Filed: Oct. 10, 2001

(86) PCT No.: PCT/SE01/02197
§ 371 (c)(1),
(2), (4) Date: Mar. 20, 2003

(87) PCT Pub. No.: WO02/30714

PCT Pub. Date: Apr. 18, 2002

(65) Prior Publication Data

US 2004/0007886 A1 Jan. 15, 2004

(30) Foreign Application Priority Data

Oct. 13, 2000 (SE) .......................... 0003696-2

(51) Int. Cl.⁷ .............................................. B60R 19/34
(52) U.S. Cl. ....................... 293/133; 293/120; 293/122; 293/155
(58) Field of Search .................................. 293/133, 120, 293/102, 155, 132, 122, 109, 121, 136; 296/187.09, 203.02

(56) References Cited

U.S. PATENT DOCUMENTS

| | | | | |
|---|---|---|---|---|
| 3,831,997 A | * | 8/1974 | Myers ......................... | 293/133 |
| 3,997,207 A | * | 12/1976 | Norlin ......................... | 293/133 |
| 4,252,355 A | * | 2/1981 | Goupy et al. ................ | 293/120 |
| 5,154,462 A | | 10/1992 | Carpenter | |
| 5,219,197 A | * | 6/1993 | Rich et al. ................... | 293/133 |
| 5,290,079 A | * | 3/1994 | Syamal ....................... | 293/120 |
| 5,441,319 A | * | 8/1995 | Oyama et al. ............... | 293/155 |
| 5,722,708 A | * | 3/1998 | Jonsson ....................... | 293/122 |
| 5,803,517 A | * | 9/1998 | Shibuya ....................... | 293/120 |
| 6,042,163 A | * | 3/2000 | Reiffer ........................ | 293/155 |
| 6,179,353 B1 | * | 1/2001 | Heatherington et al. ..... | 293/120 |
| 6,179,355 B1 | * | 1/2001 | Chou et al. .................. | 293/133 |
| 6,299,226 B1 | * | 10/2001 | Kroning et al. ............. | 293/133 |
| 6,318,775 B1 | * | 11/2001 | Heatherington et al. ..... | 293/120 |
| 6,364,384 B1 | * | 4/2002 | Kemp et al. ................. | 293/120 |
| 6,398,275 B1 | * | 6/2002 | Hartel et al. ................ | 293/120 |
| 6,406,081 B1 | * | 6/2002 | Mahfet et al. .............. | 293/133 |
| 6,435,579 B1 | * | 8/2002 | Glance ......................... | 293/120 |
| 6,554,345 B2 | * | 4/2003 | Jonsson ..................... | 296/146.6 |
| 6,609,740 B2 | * | 8/2003 | Evans ......................... | 293/120 |
| 6,663,150 B1 | * | 12/2003 | Evans ......................... | 293/133 |
| 6,669,251 B2 | * | 12/2003 | Trappe ........................ | 293/133 |
| 6,669,252 B2 | * | 12/2003 | Roussel et al. ............. | 293/120 |
| 2001/0017473 A1 | * | 8/2001 | Yamamoto ................... | 293/122 |
| 2003/0155782 A1 | * | 8/2003 | Iino ............................ | 293/142 |
| 2003/0222477 A1 | * | 12/2003 | Yoshida et al. ............. | 293/133 |

FOREIGN PATENT DOCUMENTS

| | | |
|---|---|---|
| DE | 19907783 | 10/1992 |
| WO | 9920490 | 4/1999 |
| WO | 0017017 | 3/2000 |

* cited by examiner

Primary Examiner—Kiran Patel
(74) Attorney, Agent, or Firm—Mark P. Stone

(57) ABSTRACT

A bumper arrangement for a vehicle comprises a bumper beam (17) fastened in two crash boxes (11, 12). The bumper beam (17) has a U-profile with a central flange (18) and two webs (19, 20) and has its opening towards the vehicle. The central flange has a recess (21) that is shallow at the mountings to the crash boxes (11, 12) and deepens therebetween so that the bumper beam will be so stiff that it will transfer substantial force to both crash boxes also in an off-set crash. This design makes the width of the part of the bumper beam adjacent the vehicle small.

4 Claims, 3 Drawing Sheets

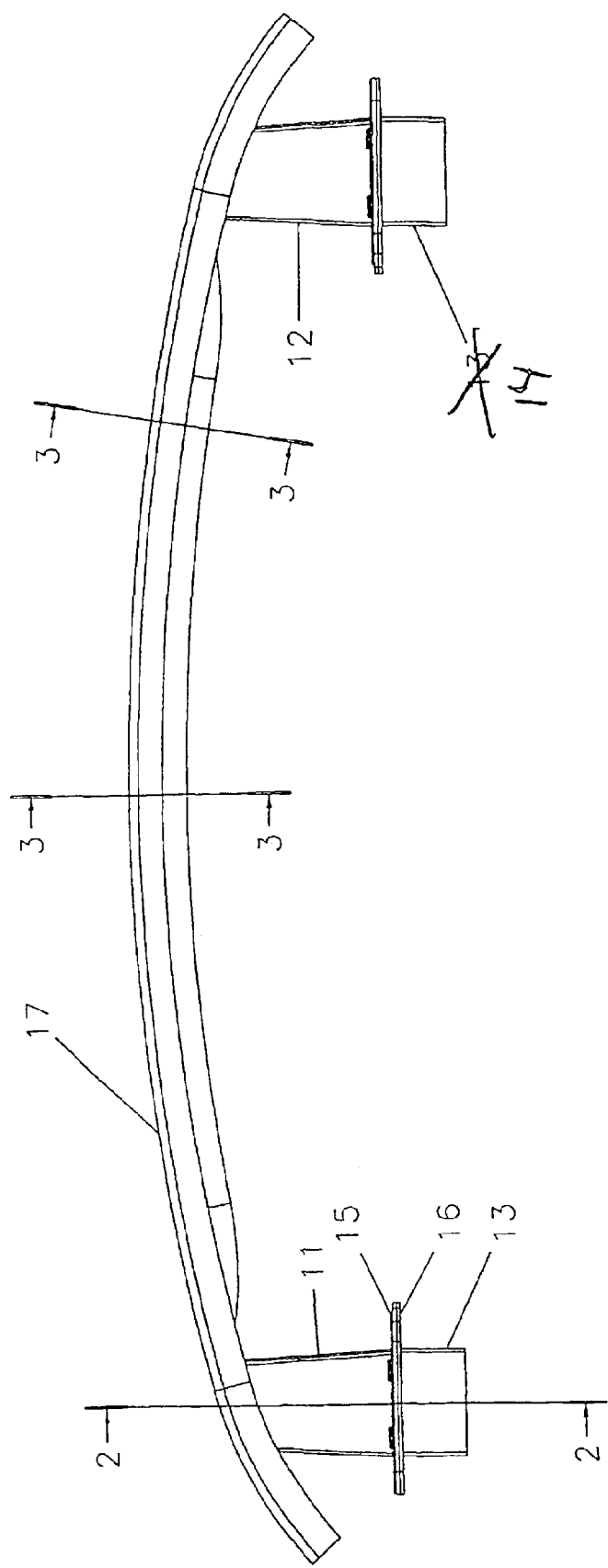

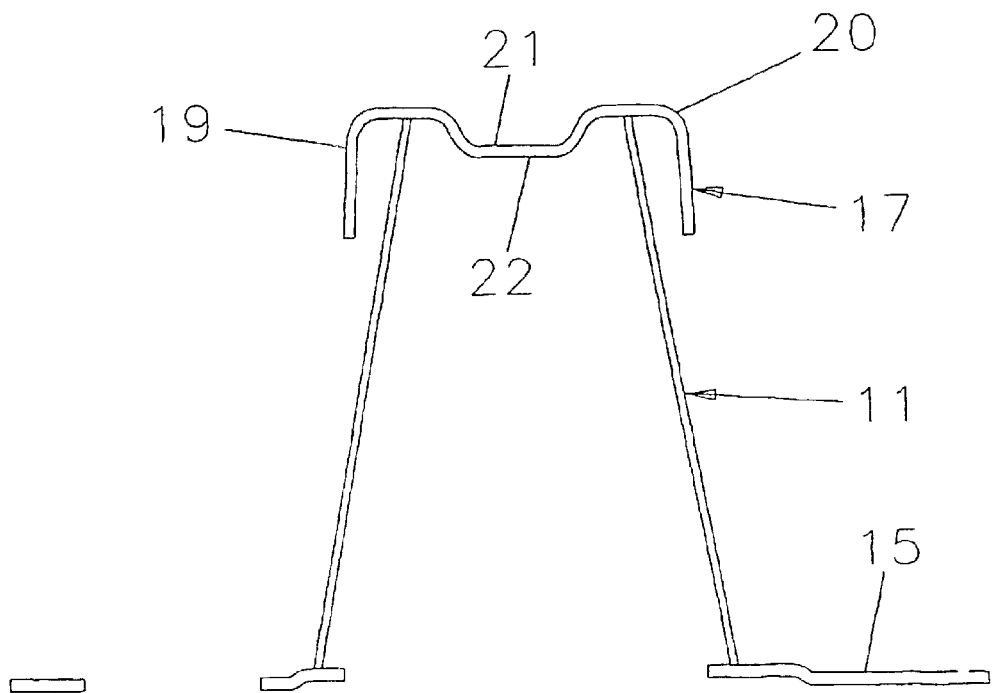
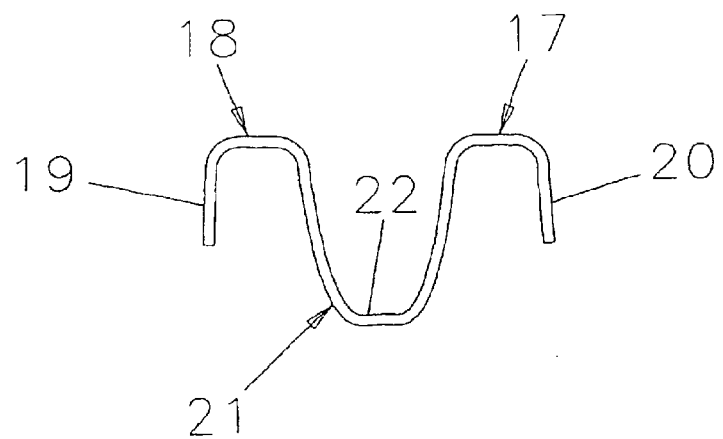

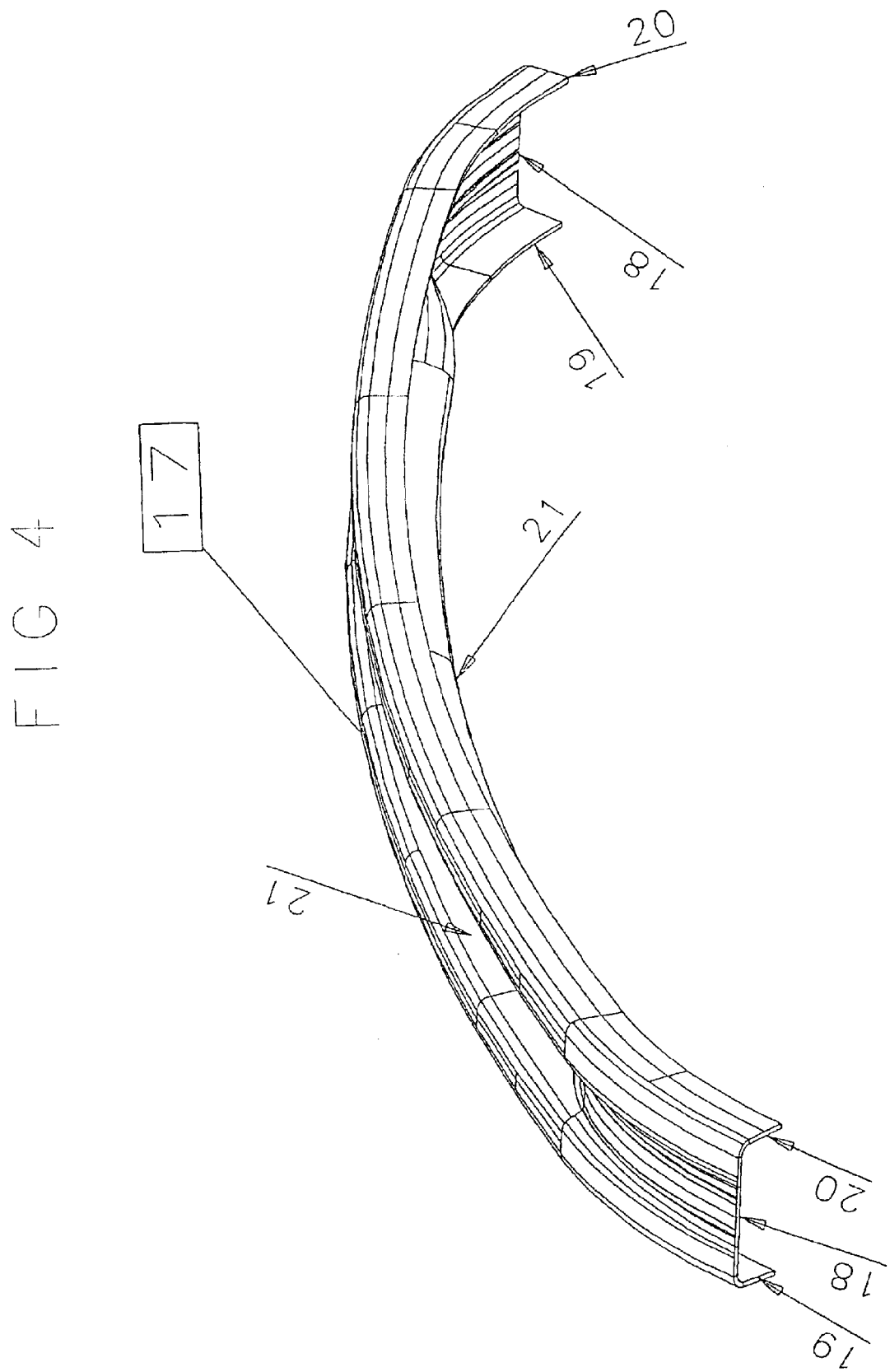

BUMPER ARRANGEMENT

TECHNICAL FIELD

This invention relates to a bumper arrangement for a vehicle, comprising a bumper beam fastened in two crash boxes.

STATE OF THE ART

The trend is towards lower fronts of passenger cars at the same time as the demands on the bumper arrangement become tougher.

OBJECT OF INVENTION AND BRIEF DESCRIPTION OF THE DRAWINGS

It is an object of the invention to provide an arrangement in which the bumper beam is fastened in crash boxes and is strong despite providing minimum hindrance for the air supply to the radiator. Another object is to provide an arrangement in which the bumper beam can transfer substantial force to both crash boxes also when it hits a barrier with only one side.

These objects are fulfilled in principle by a bumper beam that has a U-profile with a central flange and two webs and has its opening towards the vehicle, where the central flange of the profile has a recess that is shallow at its mountings to the crash boxes and deepens therebetween such that it is deeper than the webs for at least one third of the length between the mountings. The invention is defined by the claims.

BRIEF DESCRIPTION OF THE DRAWINGS

FIG. 1 shows an example of a bumper arrangement in accordance with the invention.

FIG. 2 is a section taken along the line 2—2 in FIG. 1.

FIG. 3 is a section taken along the line 3—3 in FIG. 1.

FIG. 4 is a perspective view of the bumper beam shown in FIGS. 1–3.

DESCRIPTION IN DETAIL OF THE ILLUSTRATED AND PREFERRED EMBODIMENT

FIG. 1 shows two crash boxes 11,12 fastened on the side rails 13,14 of a vehicle, for example a passenger car. A bumper beam 17 is mounted on the crash boxes. A mounting plate 15 on each crash box is fastened with screws to a corresponding end plate 16 on the side rail. The crash boxes can suitably be conical as shown, but they need not be circular.

As best shown in FIG. 4, which is a perspective drawing of the bumper beam, the ends of the bumper beam has a U-profile with a centre flange 18 and two webs or flanks 19,20. As shown in FIG. 2, the centre flange has a groove or recess 21 that is shallow relative to the webs. On the inside of the crash boxes 11,12, the depth of the groove 21 increases comparatively steeply until the groove reaches substantially below the level of the ends of the flanks 19,20 as can be seen in FIGS. 1 and 4 and in the cross section shown as FIG. 3. In a distance of more than half the distance between the inner edges of the mountings of the beam in the crash boxes, the groove 21 is so deep that it reaches below the level of the flank ends. The width of the bottom 22 of the groove is less than half the distance between the flanks 19,20 of the beam.

Since the groove 21 extends beyond the level of the edges of the flanks 19,20, the bottom 22 of the groove will have the highest load at a crash, which reduces the load on the cut edges of the flanks. When they are not bent to form side flanges, the cut edges always involve a risk of crack initiation. Side flanges would impair the air flow past the bumper beam and the straight flanks in combination with the reduced width of the part of the beam that is adjacent the radiator (the width of the bottom 22 of the beam 21) allows the air to flow past the bumper beam with a minimum of turbulence. On the parts of the bumper beam that do not disturb the air flow to the radiator and possible other devices such as the brakes, the bumper beam may have side flanges and it may then, if desirable, have the same strength in parts that do not have a deep groove as in the part that have a deep groove.

Since the bumper beam is stiff between its mountings, in a crash on one side of the bumper beam, for example on 40% of the bumper beam, a part of the load will be transmitted to the crash box on the other side, which reduces the risk of damages on the body in crashes in not too high a speed because both crash boxes will be deformed and take up energy.

What is claimed is:

1. A bumper arrangement for a vehicle, comprising a bumper beam (17) fastened in two crash boxes (11, 12), and two mountings for mounting the two crash boxes to a vehicle:

characterised in that the bumper beam (17) has a U-profile with a central flange (18) and two webs (19, 20) and has its opening towards the vehicle, and the central flange has a recess (21) that is shallower than the webs at the mountings for the crash boxes (11, 12) and deepens therebetween such that it is deeper than the webs for at least one third of the length between the mountings.

2. The bumper arrangement according to claim 1, characterised in that the recess (21) is deeper than the webs (11, 12) for at least half the length between the mountings.

3. The bumper arrangement according to claim 1, characterised in that the bottom (22) of the recess (21) has a width that is less than half the distance between the webs (19, 20) of the profile.

4. The bumper arrangement according to claim 2, characterised in that the bottom (22) of the recess (21) has a width that is less than half the distance between the webs (19, 20) of the profile.

* * * * *